United States Patent [19]
Green

[11] 3,971,962
[45] July 27, 1976

[54] LINEAR TRANSDUCER ARRAY FOR ULTRASONIC IMAGE CONVERSION

[75] Inventor: Philip S. Green, Redwood City, Calif.

[73] Assignee: Stanford Research Institute, Menlo Park, Calif.

[22] Filed: Sept. 21, 1972

[21] Appl. No.: 291,002

[52] U.S. Cl. ............................... 310/8.1; 128/2 V; 310/8.7; 310/9.1; 310/9.5; 310/9.6; 73/67.5 R; 340/5 MP
[51] Int. Cl.² ......................................... H01L 41/08
[58] Field of Search......... 310/9.5, 9.6, 8.1, 9.1–9.4, 310/8.7; 340/10, 8 MM, 8 L, 9, 5 MP, 8; 73/67.5 R; 128/2 V

[56] References Cited
UNITED STATES PATENTS

| | | | |
|---|---|---|---|
| 2,384,465 | 9/1945 | Harrison | 340/8 MM |
| 2,416,314 | 2/1947 | Harrison | 340/8 MM |
| 2,420,676 | 5/1947 | Peterson | 340/8 L |
| 2,452,068 | 10/1948 | Peterson | 340/8 L |
| 2,481,068 | 9/1949 | Best | 340/8 MM |
| 2,543,500 | 2/1951 | Kettering et al. | 310/9.6 |
| 2,716,708 | 8/1955 | Bradfield | 310/9.6 |
| 2,754,925 | 7/1956 | Burke | 340/8 MM |
| 2,848,890 | 8/1958 | Sheldon | 73/67.5 R |
| 2,899,580 | 8/1959 | Dranetz et al. | 73/67.5 R |
| 3,239,799 | 3/1966 | Boucheron et al. | 340/8 L |
| 3,278,891 | 10/1966 | Cowdery | 340/8 L |
| 3,475,551 | 10/1969 | Green et al. | 73/67.5 R |
| 3,587,561 | 6/1971 | Ziedonis | 310/9.6 |
| 3,675,472 | 7/1972 | Kay et al. | 73/67.5 R |
| 3,718,898 | 2/1973 | Cook et al. | 310/8.2 X |

OTHER PUBLICATIONS

Acoustic Imaging in a Turbid Underwater Environment, by P. S. Green et al., The Journal of the Acoustical Society of America, vol. 44, No. 6, Dec. 1968, pp. 1719–1730.

Primary Examiner—Mark O. Budd
Attorney, Agent, or Firm—Urban H. Faubion

[57] ABSTRACT

An ultrasonic transducer comprising a linear array of piezoelectric elements for converting a single line from a compressional acoustic image field to electrical impulses which, in turn, provide a means for converting the incident compressional image field to a visual representation. In order to match the configuration of the acoustic image field, the array of piezoelectric elements, in a preferred embodiment, has the configuration of an arc, that is, the array is arranged in a straight line in one plane and in an arc in a plane orthogonal to the first. The transducer is made up of a plurality of assemblies each of which is composed of segments of piezoelectric material each held in a supporting slot in a length of metal plate which slot is filled with a material selected to provide impedance matching between the piezoelectric material and the transmission medium. The array of piezoelectric elements is made from the piezoelectric segments by making fine cuts therein perpendicular to the supporting slot to form a plurality of piezoelectric "islands" and each island is electrically connected to utilization circuitry. In a preferred embodiment, an ultrasonic cylindrical lens is affixed to the supporting structure along the supporting slot and intermediate the piezoelectric array and the compressional acoustic image field to broaden the angular sensitivity pattern in the direction to compensate for the disparity between length and width (greater length) of piezoelectric elements or islands.

13 Claims, 8 Drawing Figures

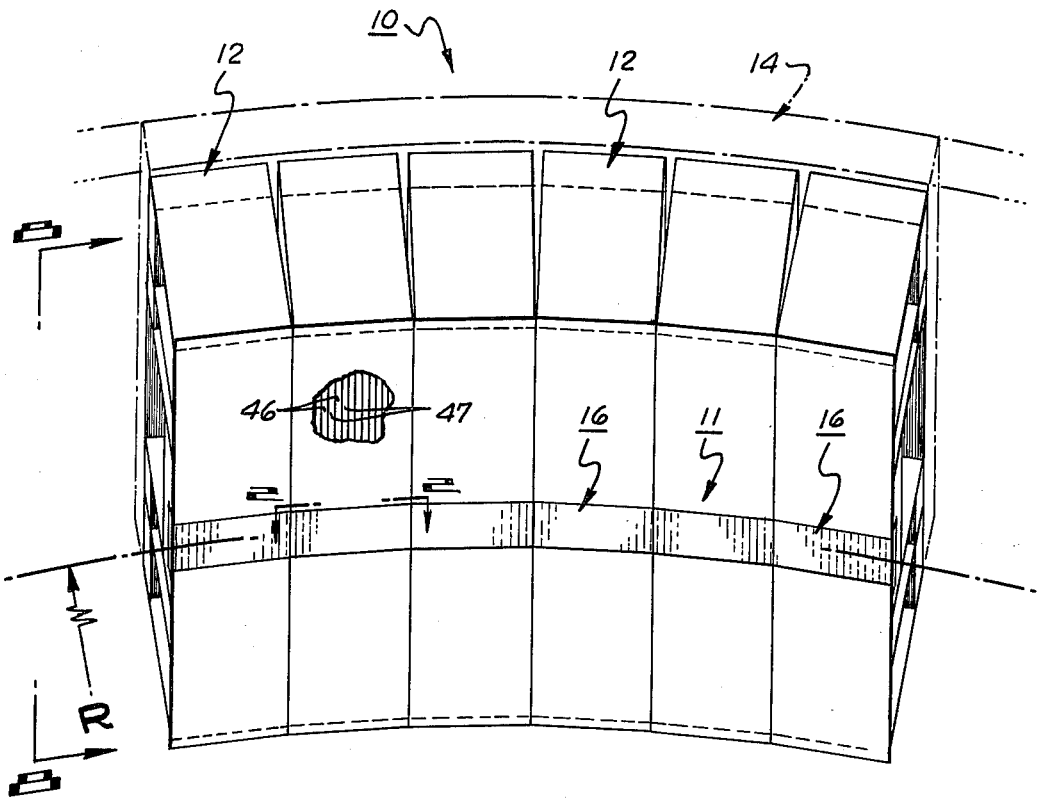
FIG_1
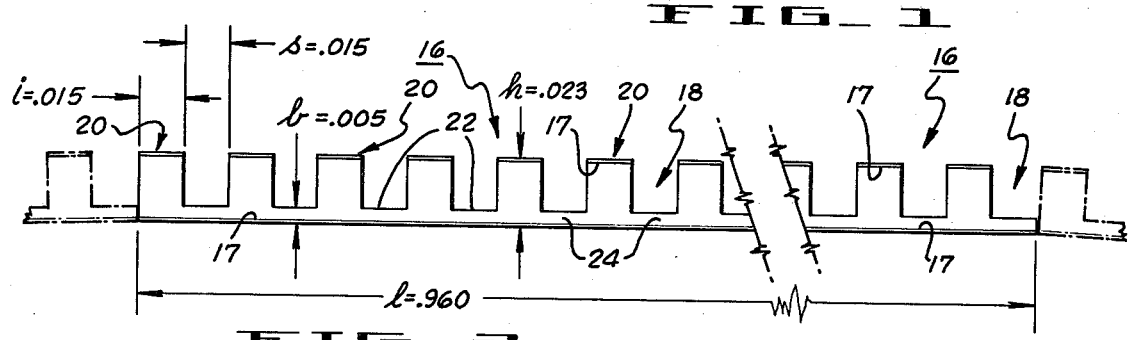
FIG_2
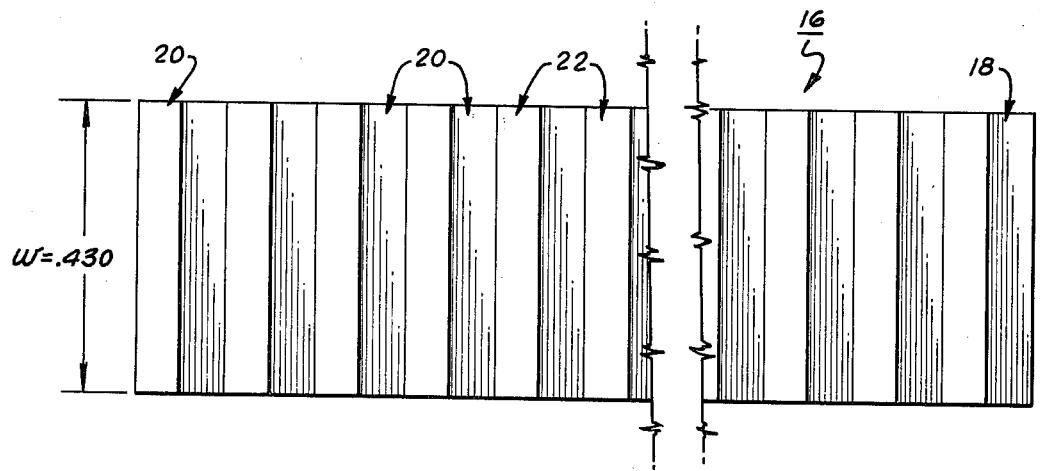
FIG_3

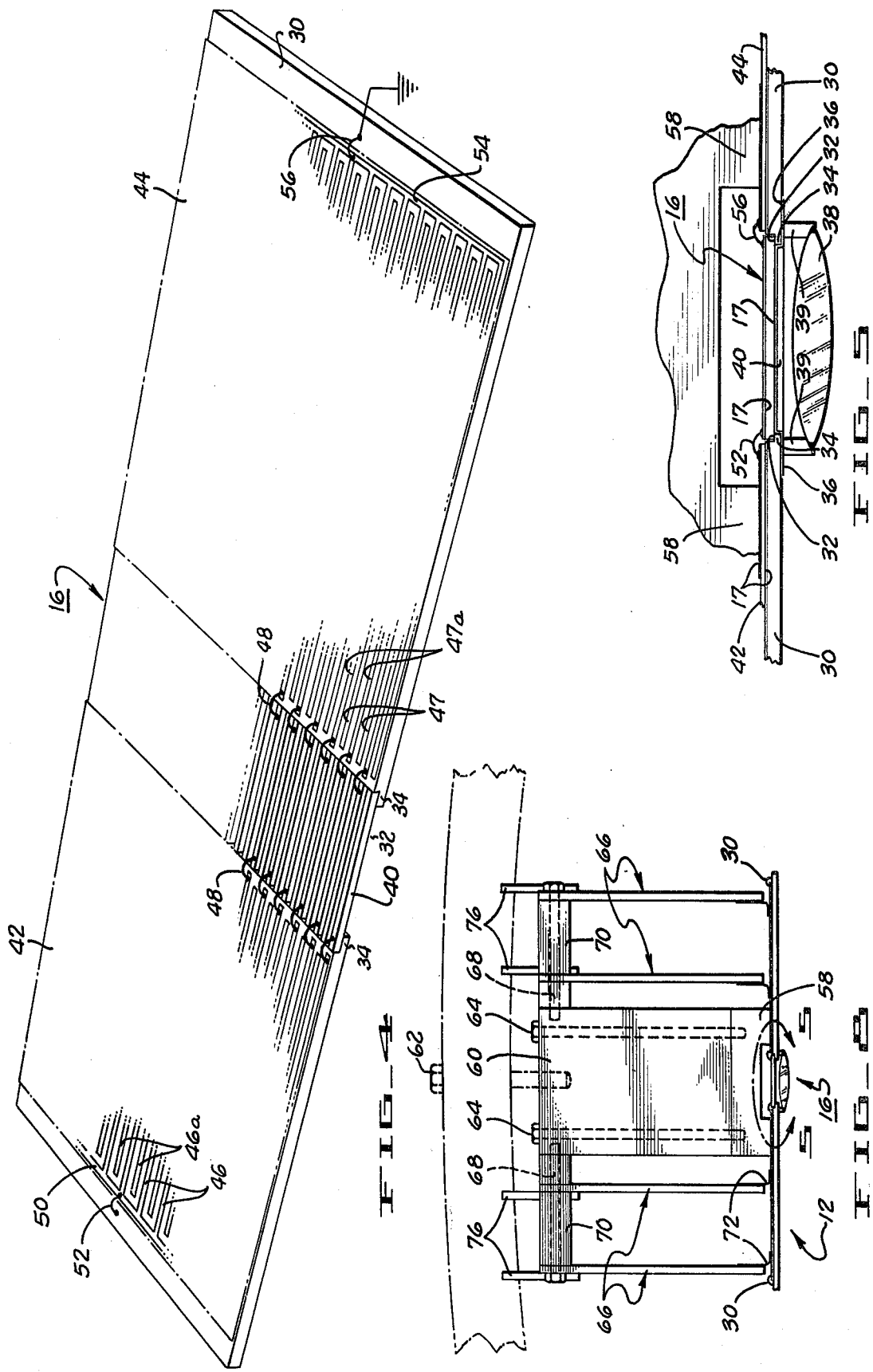

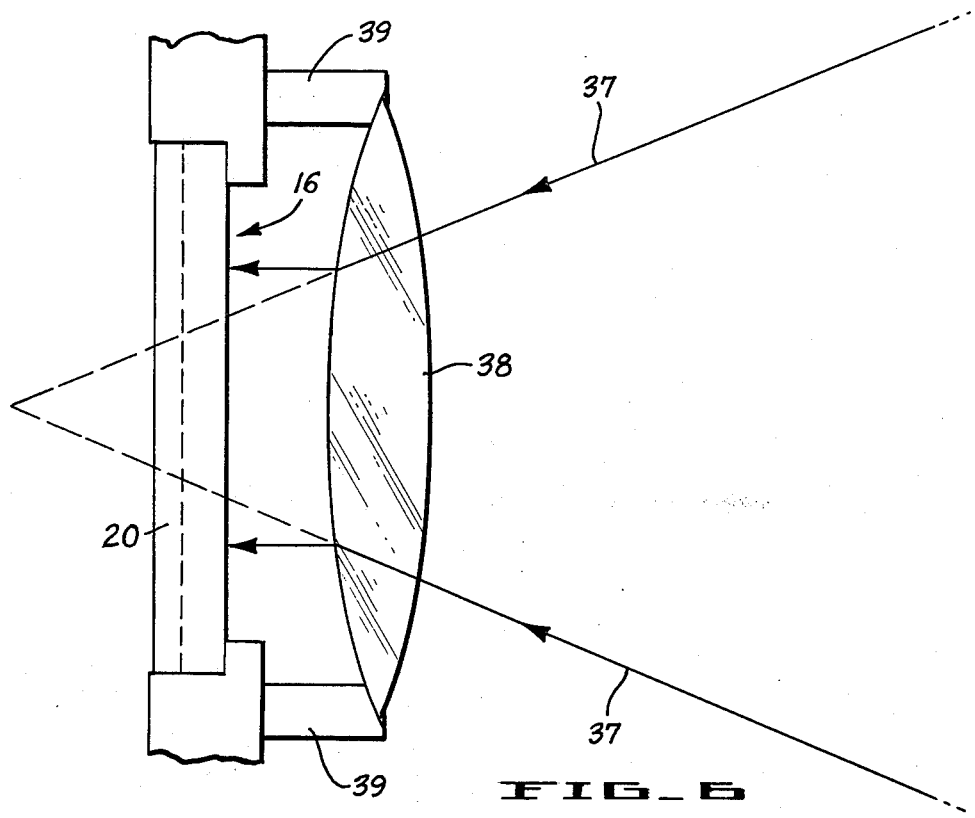
FIG_6
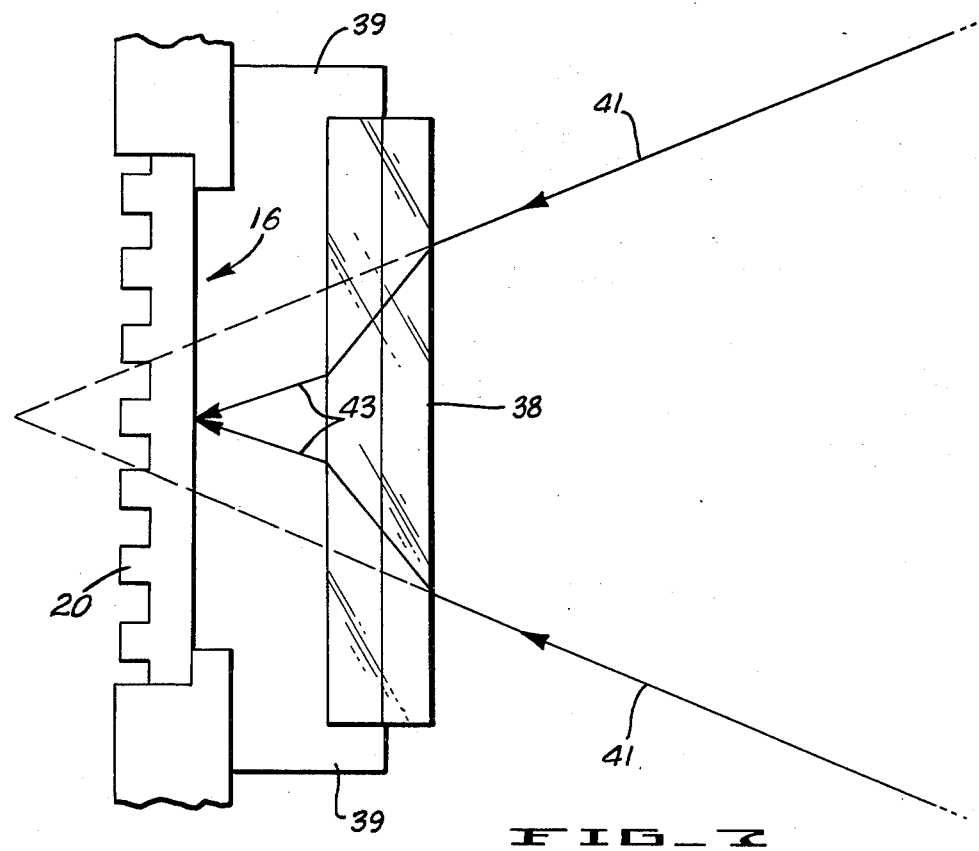
FIG_7

LINEAR TRANSDUCER ARRAY FOR ULTRASONIC IMAGE CONVERSION

BACKGROUND OF INVENTION

Visualization of acoustic wave fields has been the subject of extensive investigation with the result that a wide variety of demonstrated methods exist for converting a pattern of acoustic pressure fields in a fluid to a visible analog. A number of ultrasonographic methods have been devised that depend on the sensitivity to acoustic radiation of either photographic emulsions or certain chemical reactions.

However, sensitivities here are low (on the order of one watt per square centimeter) and exposure times of from minutes to hours are required. Numerous secondary effects of the acoustic energy absorbed by an insonified surface (e.g., luminescence, changes in color or electrical conductivity) have been used to produce both temporary and permanent images. Although these techniques are roughly an order to magnitude more sensitive than the previous ones, they are still too insensitive for practical diagnostic visualization. A somewhat more sensitive, but still slow to respond method is one in which the orientation produced by an ultrasonic field in a suspension of metal platelets is detected by optical scattering. The methods for acoustic imaging that have received the most widespread attention in recent years are those based on piezoelectric conversion of instantaneous acoustic pressures to proportional electric potentials. A two-dimensional ultrasonic pressure pattern in a fluid can be detected with great sensitivity by mechanically scanning a small piezoelectric probe over a region of the fluid through which the sound passes.

With each of the above methods, long exposure or scanning times preclude real time ultrasonic visualization. Real time visualization is, of course, highly important for medical applications. For example, the ability to observe an organ continuously as its aspect is varied, or (as may be possible with some organs) as the patient displaces it through muscular action, would be of considerable benefit to the diagnostician. To achieve this, a real time conversion method is required.

The method of optical Bragg diffraction (actually, not simply an image plane conversion method, since it embodies a distinctly different principle of image formation) is potentially capable of extremely high resolution. However, it is impractical for use at the low-megahertz frequencies required for diagnostics. The method of liquid surface relief is showing greatly improved image fidelity and sensitivity. However, with the present state of the art, the sensitivity is still marginal for diagnostic use and dynamic range sufficient for this application has not been demonstrated. Laser interferometer techniques of image conversion show promise, particularly because of their potentially high sensitivity and large image area. However, they have not yet achieved adequate sensitivity and the laser and other optical components require a large stable platform, which cannot be incorporated into a small camera unit. Another possibility, the Sokoloff tube, consists of a resonant quartz face plate on an electron-beam scanning tube. In spite of considerable effort to improve it, however, the Sokoloff tube still lacks adequate resolution and sensitivity, and is beset by reliability problems.

The best approach to real time visualization of acoustic wave fields appears to involve provision of an array or arrays of discrete piezoelectric receiving elements which are sequentially sampled in synchronization with a cathode-ray-tube display by electrical gate-circuits. Ideally, the entire image plane would be filled by a rectangular matrix of 40,000 to 100,000 receiving elements. However, the problems of producing and attaching an equal number of electronic switches and amplifiers to these elements in a confined space in a practical configuration and at reasonable cost are still beyond the state of the art. A good compromise is achieved, however, by using a hybrid converter consisting of a line array of discrete piezoelectric elements, electronically scanned at a high rate while the entire line is mechanically translated across the image plane or, alternatively, the acoustic image field is moved past the stationary array. A converter employing this general concept is described in an article by P. S. Green, J. L. S. Bellin and G. C. Knollman entitled "Acoustic Imaging in A Turbid Underwater Environment" which appears in the JOURNAL OF THE ACOUSTICAL SOCIETY OF AMERICA, Vol. 44, No. 6, December 1968, pp 1719–1730 (see pp 1726, 1727).

SUMMARY AND OBJECTS OF INVENTION

The present invention provides an ultrasonic transducer comprising a linear array of piezoelectric elements for converting a portion of a compressional acoustic image field to electrical impulses. The array is made from one or more assemblies by locating a segment of piezoelectric material in a supporting slot in a length of metal plate and providing a plurality of fine cuts in the material perpendicular to the supporting slot to form a plurality of piezoelectric islands. Each island is provided with electrical contacts for connection to utilization circuitry. In a preferred embodiment the slot in the supporting members is filled with a material which provides impedance matching between the piezoelectric material and the medium transmitting the compressional image field. As a further refinement, an ultrasonic cylindrical lens may be affixed to the supporting structure along the supporting slot intermediate the piezoelectric material and the compressional acoustic image field to broaden the sensitivity pattern, thereby approximating an array of much smaller piezoelectric elements and improving the resolution.

An important object of the invention is to provide a means for converting at least a proportion of an acoustic image field to electrical impulses and particularly to provide an array of piezoelectric elements for such purpose.

A further object of the invention is to provide such an array which is configured to match the portion of the plane of best focus of the compressional image field received by the array.

Yet another object of the invention is to provide means for matching impedance between the piezoelectric material of the array and the imaged field transmission medium.

Still a further object of the invention is to provide focusing means to compensate for any disparity between dimensions of image converting segments of the piezoelectric array and the acoustic field.

Yet another object of the invention is to provide a method for producing a linear array of piezoelectric elements for accomplishing each of the individual preceding objects.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawings.

BRIEF DESCRIPTION OF THE DRAWINGS

FIG. 1 is a perspective view of an ultrasonic transducer assembly constructed in accordance with one embodiment of the invention;

FIG. 2 is a broken edge view illustrating the configuration of the piezoelectric elements;

FIG. 3 is a broken plan view of the piezoelectric elements to the same scale as the edge view of FIG. 2;

FIG. 4 is a perspective view showing the back side of a portion of one element of the transducer assembly to illustrate the array of piezoelectric elements, their supporting structure and electrical connections;

FIG. 5 is an enlarged partially broken away end view illustrating the method of mounting the piezoelectric material and also illustrating a lens element utilized in one embodiment of the invention to broaden the angular sensitivity pattern of the piezoelectric array in a direction to compensate for the disparity between length and width of individual piezoelectric elements;

FIG. 6 is an enlarged partially broken away end view similar to FIG. 5 but showing only the edge of the piezoelectric material and lens and particularly illustrating the collimating effect of the lens for converging acoustic compressional wave fields in planes generally coincident with the elongated dimension of the individual elongated elements of the transducer array;

FIG. 7 is a view looking down on the top of the transducer array (piezoelectric slab) and the lens element, again showing only the piezoelectric material and cylindrical lens and illustrating the focusing effect of the lens for incident acoustic compressional waves converging generally in planes which intersect the longitudinal dimension of the elements of the piezoelectric array orthogonally; and FIG. 8 is a side elevation (as taken along section lines VIII—VIII of FIG. 1) illustrating the method of connecting all of the elements of each piezoelectric array supporting assembly.

DESCRIPTION OF PREFERRED EMBODIMENTS

A preferred embodiment of the transducer assembly 10 is illustrated in FIG. 1. As is explained in greater detail below, particularly in connection with FIGS. 2 and 4, the array of piezoelectric elements which convert a compressional acoustic image field to electric impulses is held in a slot 11 which extends over the full length of the assembly 10. The linear array is given the configuration of an arc in order better to fit a single line across the compressional acoustic image field although it would perform the function if it were, in fact, a straight line. The reason a curved linear array conforms to the compressional image field of interest better than would a straight line array is that the acoustic lens used to focus the image in the particular application under consideration provides a focused compressional image field in the form of a segment of a sphere; and a single line across the segment of the sphere constitutes an arc.

First consider the array of metallized piezoelectric material for each assembly 12. An edge view of one slab 16 is illustrated in FIG. 2 and a plan view is illustrated in FIG. 3. For the application, the slab is 23 mils (a mil is .001 inch) thick, 0.96 inches long, and 0.43 inches wide. A series of grooves 18 are cut across the slab 15 mils wide on 30 mil centers so that the array itself is formed of a series of 15 mil wide islands 20 which extend all the way across the slab 16. Thus, the islands are 15 mils wide, 0.43 inches long, held together by underlying (joining) portions of the piezoelectric material which portions are about 5 to 8 mils thick.

Each piezoelectric slab 16 is cut so that there are 32 islands 20 and an equal number of slots. It will be noted that there is a full island 20 at one end of the slab and a full slot 18 at the other so that when the assemblies are put together islands and slots alternate along the full length of the array. In order to provide good electrical contact across the piezoelectric array, both sides of the slab 16 are given a coating 17 of a good conductor, such as silver, prior to cutting the slots 18 therein. The slots 18, when cut, effectively separate the conductors on the top of the islands 20 so the islands may be individually connected to electrical circuits.

In order best to understand how the slabs of piezoelectric material 16 are supported, one may refer to the perspective view of the back of one piezoelectric slab 16 and its support illustrated in FIG. 4 and the enlarged partially broken away edge view of FIG. 2.

The support for the piezoelectric slab 16 constitutes what may be considered a length of metal 30 having a supporting slot 32 down the full length. As illustrated, the slot extends all the way through the length of metal so that it might also be considered two pieces, but for convenience, and because of the way it is constructed, we refer to it as one length. In order to provide a support for the piezoelectric slab 16, a part of the slot extends only part way through the length of metal from the back so that a lip 34 is provided on each side of the slot whereby the piezoelectric slab 16 will fit against the land on each lip 34 down its entire length with the top of the islands 20 just flush with the back side of the metal strip 30. The wide part of the slot 32 has the same width (0.43 inch) as the piezoelectric slab 16 and the lands on the lips 34 are about 15 mils wide. The piezoelectric slab 16 is retained in the slot 32 by an epoxy glue.

When gluing the piezoelectric slab 16 in the slot 32, the glue is likely to interfere with the electrical connection between the conductive coating 17 on the front face of the slab and the metal support member 30. Therefore, it is preferable to provide a conductive coating 36 (such as gold), best seen in FIG. 5, which extends over the conductive coating 17 on the face of the piezoelectric slab 16 and at least part way on to the lips 34 of the metal support 30 on both sides of the slot 32. The reason for providing conductors on opposite sides of the piezoelectric slab is, of course, to derive the electrical signal (voltage) generated by the compressional image field impinging on the surface of the piezoelectric slab.

In order to obtain the best possible transfer of energy between an incident compressional image field and the piezoelectric slab 16, an impedance matching material is bonded to the face of the piezoelectric slab 16 in the slot 32. The slot 32 has a width equal to a number of wave lengths in the transmission medium of the ultrasonic frequency to be detected. Here the slot is 0.4 inch wide (dimension between lips 34). The impedance matching material 40 which fills the slot is selected to have an impedance equal to the square root of the product of the impedance of the piezoelectric ceramic and the transmission medium, thus forming an impedance matching section. An example of suitable matching material is epoxy or polystyrene mixed with tungsten or aluminum powder to obtain the right impedance. The thickness of the matching material is the same as the thickness of the lip 34 of the metal supporting plate 30, viz., one-quarter wave length (in the matching material) of the ultrasonic frequency to be detected. For the application considered here the thickness of the matching material is eight mils and the mixture is 58% (by weight) tungsten powder and 42% epoxy of the type manufactured by Shell Oil Company and sold commercially under the trade name Epon 828. The acoustic impedance presented is 7.1 kilograms per meter squared second.

Each piezoelectric island or element 20 constitutes one sampling element of the total sampling array and the sampling takes place sequentially an element at a time down a single line at a time across the compressional image field and then the next adjacent line of the compressional image field is scanned. Thus, the best quality reproduction of the image field results if the sampled segments mesh or interlace well. A way to accomplish this is to construct each element of the sampling array to have equal height and width, i.e., square elements. As a result of the practical construction technique used, however, the elements 20 of the array have a greater length (height) than width. Therefore, in order to compensate for this disparity, a cylindrical collimating lens 38 is provided down the length of the slot 32 of the transducer array and parallel to it, spaced from the transducer array a distance that permits the converging incident wave field to focus in the plane of the array along the direction parallel to the cylindrical lens.

The proper spacing between the collimating lens 38 and the elements 20 of the transducer array 16 is provided by lens securing spacers 39 that extend down the length of the supporting slot 32 on opposite sides thereof and on the upper surface of the metal support 30. The lower edge of the spacers 39 are secured to the upper surface of the metal support 30 as by bonding and the upper edge, which is chamfered down its length to fit the curvature of the lens 38, is bonded to the lower surface of the lens. Thus, the spacers 39 hold the lens 38 in proper spaced relation above the elements 20 of the piezoelectric slab 16. The material of the spacers 39 is not critical and the distance between the spacers is not critical except that they should be spaced far enough away from the edges of the slot 32 that holds the piezoelectric slab 16 so that they do not disturb the incident acoustic compression field.

FIGS. 6 and 7 illustrate the action of the lens which permits focusing of a converging wave field in one set of planes and collimation of converging wave fields in another set of planes. That is, FIG. 6 shows schematically, by converging lines 37, that converging wave fields which are generally in planes along the vertical dimension of the piezoelectric elements 20 of the array 16 pass through the lens 38 and, due to the curved faces of the cylindrical lens, become collimated in planes that are generally along the longitudinal dimensions of elongated piezoelectric elements 20 of the array 16 (that is, perpendicular to the longitudinal axis of the collimating lens 38). FIG. 7, on the other hand, shows diagrammatically, by the lines 41 and the arrows thereon, that converging wave fields which are generally in planes along the longitudinal axis of the collimating lens 38 are focused.

Following the incident converging wave fields designated by the lines 41, it is seen that the incident wave field first speeds up upon encountering the collimating lens 38 (indicated by the fact that the lines are bent inwardly in the lens 38) since the lens is made of a material wherein sound has a velocity greater than it does in the surrounding sound conducting medium. When the sound waves emerge from the lens 38 on the array side, they are again slowed down and, therefore, again converge (designated by lines 43) at their original angle of incidence. The collimating lens 38 is spaced from the piezoelectric elements 20 of slab 16 by the distance required for sound waves to be focused on the surface of piezoelectric elements 20. If made of material having a velocity of sound greater than that of the surrounding sound conducting medium, the lens is made convex in the cross section parallel to the height of the islands 20 (across the slot 32) but uniform in any given cross section parallel to the longitudinal dimension of the slot 32.

In practice, the compensating lens 38 may be made in one curved piece which fits down the full length of the slot 11 on the entire transducer assembly 10, or it may be made in segments which cover the slot 32 for only one assembly 12 and have its ends chamfered (not shown) so that only one lens is effectively formed when the individual assemblies 12 are put together to form the one total transducer assembly 10. In some cases, for example with square rather than elongated array elements, the lens 38 is unnecessary, therefore the lens is not shown in the full assembly drawing of FIG. 1 or the individual assembly 12 illustrated in FIG. 4.

The electrical connection is made between the front side of the array of piezoelectric elements 20 and the metal strip 30 by means of conducting cement, or of the gold coating 36 described in connection with FIG. 5. As part of the means to make electrical connections to the silver coating 17 on the back side of the islands 20, a pair of printed circuit boards 42 and 44 (see FIG. 4) are bonded to the back of the metal strip 30 of each individual assembly 12 on opposite sides of the piezoelectric slab holding slot 32 with their edges extending over opposite edges of the slab 16 so that the edges of the slab 16 are sandwiched between a lip 34 of the metal strip 30 and a printed circuit board. The sides of the printed circuit boards 42 and 44 which are bonded to the back of the metal strip 30 are nonconductive. The opposite sides of the circuit boards 42 and 44 have conductive material etched away so that a plurality of conductive fingers (46 and 46a on 42 and 47 and 47a on board 44) extend across the boards parallel to the islands 20 and slots 18 in the piezoelectric slab 16 and in register with the islands. Thus, there are exactly the same number of conductive fingers 32 on each of the boards 42 and 44 as there are islands 20 on the piezoelectric slab 16.

Alternate fingers on each board are connected to alternate islands 20 by means of small lead wires 48 which are ultrasonically bonded to alternate fingers on the contacted circuit board and the silver coating 17 on the back of alternate piezoelectric elements 20. For convenience and clarity the contacted fingers on the circuit board 42 (the circuit board on the left-hand side viewed in FIG. 2) are labeled 46a and the contacted fingers on circuit board 44 (the right-hand circuit board as viewed in FIG. 2) are labeled 47a. The fingers which are contacted are in direct register with the contacted piezoelectric element 20; therefore, the contacted conductive fingers 46a on printed circuit board 42 are directly opposed to noncontacted fingers 47 on printed circuit board 44 and contacted conductive fingers 47a on printed circuit board 44 are in direct register with noncontacted fingers 46 on printed circuit board 42.

The noncontacted fingers 46 and 47 on both of the printed circuit boards provide a means to shield the contacted leads 46a and 47a which are part of the active circuit. In order to perform the shielding function, the noncontacted fingers 46 on printed circuit board 42 are all contacted (to form a single conductive element) by a conductive strip 50 which extends down the outer periphery (the side away from the slot 32) of the printed circuit board so that the Faraday shield formed thereby gives the appearance of a comb. The shield is completed by providing a conductive lead 52 which is ultrasonically bonded both to the back conductive strip 50 on the comb-like shield and to the closest adjacent portion of the supporting metal strip 30.

In like manner, the active circuit leads 47a on the printed circuit board 44 are shielded by providing a conductive strip 54 down the outer periphery of printed circuit board 44 which contacts the remaining fingers 47 on that board and which is connected to the closest adjacent portion of metal strip 30 by a lead 56 ultrasonically bonded to the conductive strip 54 on the comb-like structure and the metal strip 30. Thus, the comb-like conductive structures on both of the printed circuit boards 42 and 44 are effectively connected to ground potential to form a Faraday shield that prevents interfering pickup between the conductive leads 46a and 47a of the active circuit.

The individual transducer assemblies 12 each must be held together rigidly to avoid any possibility that the piezoelectric transducer slab 16 will be broken and provision must be made so that the assemblies 12 may be accurately and rigidly held together to form the total transducer assembly 10. In order to hold opposite sides of metal strip 30 in rigid relationship, a channel shaped bridge member 58 (see FIG. 5) is provided which extends across the back of the piezoelectric slab 16 with its channel extending over and parallel to the slot 32 in the metal strip 30. The support bridge member 58 is made of a nonconductive material such as plastic so that it does not interfere with conduction in the conductive fingers on the printed circuit boards 42 and 44. The legs of the channels are rigidly fixed, here by gluing with an epoxy cement, to the printed circuit boards.

In order to provide means for connecting the individual assemblies 12 to the arcuate assembly support member or shoe 14 for the entire transducer assembly 10 and also to provide a means for securing some of the electronic circuitry to the assembly, an aluminum block 60 is fixed as by bolts 62 to the back of the bridge support member 58. This support arrangement, i.e., the two member aluminum block 60 and support bridge member 58, is used rather than using a single one-piece larger block and channel for practical reasons which are not considered critical. For example, the bridge member 58 should be nonconductive whereas it is not necessary for the entire block to be nonconductive. Aluminum is a light and relatively inert material which makes a good strong support and the assembly is easier to handle physically when made in two parts. That is, registry of the individual assemblies 12 can be more easily accomplished.

As noted, the aluminum support block 60 is supported by the arcuate support shoe 14 and held thereto by means of bolts 64 which extend through the arcuate shoe and into the back of the aluminum block. Also supported by the aluminum block are four printed circuit boards 66 each of which supports the elements and the conductors of four preamplifiers (a total of 32 preamplifiers). Two of the preamplifier boards are supported on each side of the aluminum block and extend downward therefrom toward the printed circuit boards 42 and 44 on the back of the conductive metal strip 30. The printed circuit boards on each side of the aluminum block are mounted parallel to each other. An insulating block 68 is positioned between the inner printed circuit boards 66 and the support block 60 and a space and insulating block 70 is positioned between the inner printed circuit boards 66 and the next outer preamplifier board.

In order to provide the electrical connections between the preamplifiers on the printed circuit boards 66 and the conductive fingers on the printed circuit boards 42 and 44, conductive strips 72 extend from the appropriate conductive fingers 46 and 47 to circuits on the preamplifier boards 66. Thus, the electrical signal generated by each element of the piezoelectric array on each individual transducer assembly 12 is transmitted through the conductive fingers 46 and conductors 72 to individual preamplifiers on the printed circuit boards 66. Individual sockets 76 are provided on each of the printed circuit boards 66 to receive conductors that carry the amplified electrical signals representing the compressional image field for further amplification or utilization. The precise preamplifier circuits utilized are not illustrated here since they are conventional and do not constitute a part of the present invention. Suitable preamplifier and amplifier circuits can be found in any elementary text.

While particular embodiments and structural arrangements are shown, it will be understood that the invention is not limited to these arrangments and structures since many modifications may be made in materials, arrangement of structural elements and arrangement of circuit elements. It is contemplated that appended claims will cover any such modifications which fall within the spirit and scope of the invention.

What is claimed is:

1. An ultrasonic transducer for converting a portion of a focused compressional acoustic image field of an area to be viewed to electric impulses representative of the incident focused compressional image field and which are used to produce a detailed image of the said area, including an array of piezoelectric elements arranged in a single curved line, said curve being defined by the configuration of the said focused compressional acoustic image field to be converted, whereby said array of piezoelectric elements converts a single line across said focused compressional acoustic image field to electric impulses.

2. An ultrasonic transducer, as defined in claim 1, wherein said curve is essentially an arc.

3. An ultrasonic transducer, as defined in claim 2, wherein said array of piezoelectric elements constitutes a plurality of transducer assemblies arranged side by side, each of said assemblies including a single linear array of piezoelectric elements formed in a single piezoelectric slab, said single linear array comprising a plurality of relatively thick rectangular islands separated by relatively thin rectangular areas.

4. An ultrasonic transducer, as defined in claim 1, wherein said array of piezoelectric elements constitutes a plurality of transducer assemblies arranged side by side, each of said assemblies including a single linear array of piezoelectric elements, said single linear array of piezoelectric elements formed in a single slab of piezoelectric material and comprising a plurality of relatively thick rectangular islands separated by relatively thin rectangular areas.

5. An ultrasonic transducer, as defined in claim 4, wherein a layer of acoustic impedance matching material is provided in intimate contact with one surface of said single linear array of piezoelectric elements and transposed between said elements and the said acoustic image field to be converted, said impedance matching material having a thickness of substantially one-quarter wave length at the frequency of interest.

6. An ultrasonic transducer, as defined in claim 5, wherein said impedance matching material consists of a mixture of substantially 42% epoxy and 58% tungsten powder by weight.

7. An ultrasonic transducer, as defined in claim 1, wherein a layer of acoustic impedance matching material is provided in intimate contact with one surface of said array of piezoelectric elements and interposed between said elements and the said acoustic image field to be converted, said impedance matching material having a thickness of substantially one-quarter wave length at the frequency of interest.

8. An ultrasonic transducer, as defined in claim 7, wherein said impedance matching material consists essentially of a mixture of substantially 42% epoxy and 58% tungsten powder by weight.

9. An ultrasonic transducer, as defined in claim 7, including a cylindrical lens extending along and centered over the said array of piezoelectric elements between said acoustic image field and said impedance matching layer, thereby compensating for a disparity between length and width of said piezoelectric elements.

10. An ultrasonic transducer, as defined in claim 8, including a cylindrical lens extending along and centered over the said array of piezoelectric elements between said acoustic image field and said impedance matching layer, thereby compensating for a disparity between length and width of said piezoelectric elements.

11. An ultrasonic transducer for converting a portion of a compressional acoustic image field to electric impulses including a linear array of piezoelectric elements, said array comprising a plurality of relatively thick rectangular islands separated by relatively thin rectangular areas, electrical contact means for making electrical connections to said piezoelectric elements including a common electrical conductor connected to a common surface of said piezoelectric elements, individual electrical contacts connected to the opposite surface of each of said piezoelectric islands, shielding means connecting the said conductor on the common surface of said piezoelectric elements to a first set of conductors, which consists of the said conductor on alternate ones of said piezoelectric islands and a second set of conductors each connected to one of said individual contacts on said piezoelectric islands, whereby electrical signals generated by said piezoelectric elements are derived between the said common conductor and said second set of conductors.

12. An ultrasonic transducer, as defined in claim 11, including amplifying means connected between said common conductor and each individual one of said second set of conductors thereby to receive and amplify electrical signals generated by the individual piezoelectric elements.

13. An ultrasonic transducer for converting a portion of a focused compressional acoustic image field of an area to be viewed to electric impulses representative of the incident focused compressional image field which impulses are used to produce a detailed image of the said area, including an array of piezoelectric elements arranged in a single line of the shape to match the configuration of a line across the said focused compressional acoustic image field to be converted, whereby said array of piezoelectric elements converts a single line across said focused compressional acoustic image field to electric impulses, said array of piezoelectric elements constituting a plurality of transducer assemblies arranged side by side, each of said assemblies including a single linear array of piezoelectric elements formed in a single piezoelectric slab, said single linear array comprising a plurality of relatively thick rectangular islands separated by relatively thin rectangular areas.

\* \* \* \* \*